(12) United States Patent
Chen et al.

(10) Patent No.: US 11,652,353 B2
(45) Date of Patent: *May 16, 2023

(54) DEVICES TO BE CHARGED AND CHARGING CONTROL METHODS

(71) Applicant: GUANGDONG OPPO MOBILE TELECOMMUNICATIONS CORP., LTD., Dongguan (CN)

(72) Inventors: Shebiao Chen, Dongguan (CN); Jun Zhang, Dongguan (CN); Jialiang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,082

(22) Filed: Apr. 12, 2022

(65) Prior Publication Data

US 2022/0239116 A1 Jul. 28, 2022

Related U.S. Application Data

(63) Continuation of application No. 16/860,331, filed on Apr. 28, 2020, now Pat. No. 11,336,102, which is a
(Continued)

(51) Int. Cl.
*H01M 10/44* (2006.01)
*H01M 10/46* (2006.01)
*H02J 7/00* (2006.01)

(52) U.S. Cl.
CPC ............ *H02J 7/0024* (2013.01); *H02J 7/007* (2013.01); *H02J 7/00032* (2020.01); *H02J 7/0042* (2013.01)

(58) Field of Classification Search
CPC ........ H02J 7/007; H02J 7/0042; H02J 7/0024; H02J 7/00032; H02J 7/0034; H02J 2010/4271
(Continued)

(56) References Cited

U.S. PATENT DOCUMENTS 6,404,165 B1 6/2002 Shinpo et al.
11,336,102 B2* 5/2022 Chen ...................... H02J 7/007
(Continued)

FOREIGN PATENT DOCUMENTS

CN 101908771 A 12/2010
CN 103236832 A 8/2013
(Continued)

OTHER PUBLICATIONS

International Search Report and Written Opinion dated Sep. 18, 2019 in International Application No. PCT/CN2018/122795. English translation attached.
(Continued)

*Primary Examiner* — Edward Tso
(74) *Attorney, Agent, or Firm* — Sheppard, Mullin, Richter & Hampton LLP

(57) ABSTRACT

Provided is a device to be charged. The device includes: a battery supply circuit, including first and second cells configured to switch between being coupled in parallel with each other and being coupled in series with each other; a charging interface, through which the device receives output voltage and current of an adapter; a first charging circuit coupled between the charging interface and the battery supply circuit, and configured to convert the output voltage and apply the converted output voltage on both ends of the first and second cells coupled in parallel; and a second charging circuit coupled between the charging interface and the battery supply circuit, and configured to directly apply
(Continued)

the output voltage and current on both ends of the first and second cells coupled in series, or directly apply the output voltage and current on both ends of the first and second cells coupled in parallel.

20 Claims, 12 Drawing Sheets

Related U.S. Application Data continuation of application No. PCT/CN2018/122795, filed on Dec. 21, 2018.

(58) Field of Classification Search
USPC .................. 320/107, 116, 117, 121, 134, 136
See application file for complete search history.

(56) References Cited

U.S. PATENT DOCUMENTS

| | | |
|---|---|---|
| 2010/0052614 A1 | 3/2010 | Mariels |
| 2017/0117724 A1 | 4/2017 | Kong |
| 2017/0294790 A1 | 10/2017 | Tian et al. |
| 2018/0026466 A1 | 1/2018 | Hwang |
| 2018/0248385 A1 | 8/2018 | Zhang et al. |
| 2018/0316198 A1 | 11/2018 | Niizuma |
| 2018/0342866 A1 | 11/2018 | Ellenberger |
| 2021/0091576 A1 | 3/2021 | Zhang |

FOREIGN PATENT DOCUMENTS

| | | | |
|---|---|---|---|
| CN | 203690968 U | 7/2014 | |
| CN | 105471001 A | 4/2016 | |
| CN | 105743146 A | 7/2016 | |
| CN | 106451669 A | 2/2017 | |
| CN | 108124498 A | 6/2018 | |
| EP | 3340425 A1 | 6/2018 | |
| JP | H037436 A | 1/1991 | |
| JP | H09252528 A | 9/1997 | |
| JP | H11103534 A | 4/1999 | |
| JP | 2009284606 A | 12/2009 | |
| JP | 2017093091 A | 5/2017 | |
| JP | 2018535630 A | 11/2018 | |
| RU | 2667154 C2 | 9/2018 | |
| WO | 2018152786 A1 | 8/2018 | |

OTHER PUBLICATIONS

Australian Examination Report No. 1 for Australian Application 2018432185 dated Oct. 13, 2020, 4 pages.
Extended European Search Report for EP application 18941097.0 dated Feb. 1, 2021, 15 pages.
Indian Office Action for Indian Application 202017002616 dated Nov. 9, 2020, 5 pages.
Partial Supplementary European Search Report for EP application 18941097.0 dated Dec. 9, 2020, 14 pages.
Australian Examination Report No. 2 for Australian Application 2018432185 dated Mar. 24, 2021, 6 pages.
Canadian Office Action for Canadian Application 3,068,896 dated Mar. 30, 2021, 4 pages.
Japanese Office Action with English Translation for Japanese Application 2020-506860 dated Apr. 16, 2021, 14 pages.
European Communication pursuant to Article 94(3)EPC for EP Application 18941097.0 dated Oct. 18, 2021, 5 pages.
Australian Examination Report No. 3 for Australian Application 2018432185 dated Aug. 5, 2021, 3 pages.
Grant Notice with English Translation for Japanese Application 2020-506860 dated Aug. 10, 2021, 5 pages.
Korean 1st Office Action with English Translation for Korean Application 10-2020-7004225 dated Aug. 20, 2021, 11 pages.
European Communication pursuant to Article 94(3)EPC for EP Application 18941097.0 dated Mar. 25, 2022, 5 pages.
Korean Grant Notice with English Translation for Korean Application 1020207004225 dated Dec. 29, 2021, 4 pages.
Non-Final Rejection for U.S. Appl. No. 16/860,331 dated Sep. 23, 2021, 6 pages.
Notice of Allowance for U.S. Appl. No. 16/860,331 dated Jan. 12, 2022, 5 pages.
Australian Notice of Acceptance for AU application 2018432185 dated Oct. 14, 2021, 3 pages.
First Office Action with a Search Report dated Apr. 8, 2022 received in Russian Patent Application No. RU2020105653. English translation attached.
Office Action with a Search Report dated Sep. 21, 2022 received in Brazilian Patent Application No. BR112020002467-8.
Written Opinion dated Jan. 9, 2023 received in Singapore Patent Application No. SG11202000653X.
First Office Action from corresponding Chinese Application No. 201880034655.7, dated Mar. 23, 2023. English translation attached.

* cited by examiner

50

| in response to that the voltage difference between the first cell and the second cell is greater than the first voltage difference threshold, controlling the first switching unit and/or the second switching unit to operate in a linear region to provide a current-limiting resistor for the first cell and/or the second cell | S502 |

↓

| in response to that the voltage difference between the first cell and the second cell is less than a second voltage difference threshold, controlling the first switching unit and the second switching unit to operate in a conducting state | S404 |

FIG. 17

DEVICES TO BE CHARGED AND CHARGING CONTROL METHODS

CROSS-REFERENCE TO RELATED APPLICATION(S)

This application is a continuation application of U.S. application Ser. No. 16/860,331, filed on Apr. 28, 2020, which is a continuation application of International Application No. PCT/CN2018/122795, filed Dec. 21, 2018, the entire contents of which are incorporated herein by reference.

TECHNICAL FIELD

The present disclosure relates to the field of battery technologies, and more particularly, to a device to be charged and a charging control method.

BACKGROUND

Devices to be charged (e.g., smart phones, mobile terminals or smart devices) are increasingly favored by consumers. However, the devices to be charged consume a large amount of power and need to be charged frequently, and it takes a few hours for charging fully the devices to be charged by a low-power normal charging scheme. To cope with this challenge, the industry proposed a fast charging scheme that increases the charging power for charging the devices to be charged.

It becomes a technical problem how to provide a battery supply circuit that can accommodate multiple charging schemes (including normal charging schemes and fast charging schemes) in the same device to be charged to increase the scalability and adaptability of the device to be charged.

The above information disclosed in this Background section is only for enhancement of understanding of the background of the present disclosure, and thus it may include information that does not constitute a prior art known to those of ordinary skill in the art.

SUMMARY

Additional aspects and advantages of embodiments of the present disclosure become apparent from the following descriptions, or be learned from the practice of the embodiments of the present disclosure.

In a first aspect, a device to be charged is provided. The device to be charged includes a battery supply circuit and a charging interface. The battery supply circuit includes a first cell and a second cell. The first cell and the second cell are configured to switch between being coupled in parallel with each other and being coupled in series with each other. The device to be charged receives an output voltage and an output current of an adapter through the charging interface. The device to be charged further includes a first charging circuit and a second charging circuit. The first charging circuit is coupled between the charging interface and the battery supply circuit, and is configured to convert the output voltage, and apply the converted output voltage on both ends of the first cell and the second cell coupled in parallel in the battery supply circuit. The second charging circuit is coupled between the charging interface and the battery supply circuit; and the second charging circuit is configured to directly apply the output voltage and the output current on both ends of the first cell and the second cell coupled in series in the battery supply circuit, or directly apply the output voltage and the output current on both ends of the first cell and the second cell coupled in parallel in the battery supply circuit.

In a second aspect, a charging control method is provided for charging a device to be charged. The device to be charged includes a battery supply circuit, a charging interface and a charging integrated circuit. The battery supply circuit includes a first cell and a second cell. The method includes: in response to receiving a first control instruction, switching the first cell and the second cell to be coupled in series in the supply circuit; in response to receiving a second control instruction, switching the first cell and the second cell to be coupled in parallel; receiving an output voltage and an output current of an adapter through the charging interface; converting the output voltage by the charging integrated circuit, and applying the converted output voltage on both ends of the first cell and the second cell coupled in parallel in the battery supply circuit; and directly applying the output voltage and the output current on both ends of the first cell and the second cell coupled in series in the battery supply circuit, or directly applying the output voltage and the output current on both ends of the first cell and the second cell coupled in parallel in the battery supply circuit.

It should be noted that the above general description and the following detailed description are merely examples and are not intended to limit the disclosure.

BRIEF DESCRIPTION OF DRAWINGS

The above and/or additional aspects and advantages of embodiments of the present disclosure will become apparent and more readily appreciated from the following descriptions made with reference to the drawings, in which:

FIG. 17 is a flowchart of a charging control method according to an example embodiment.

DETAILED DESCRIPTION

Figure 1:
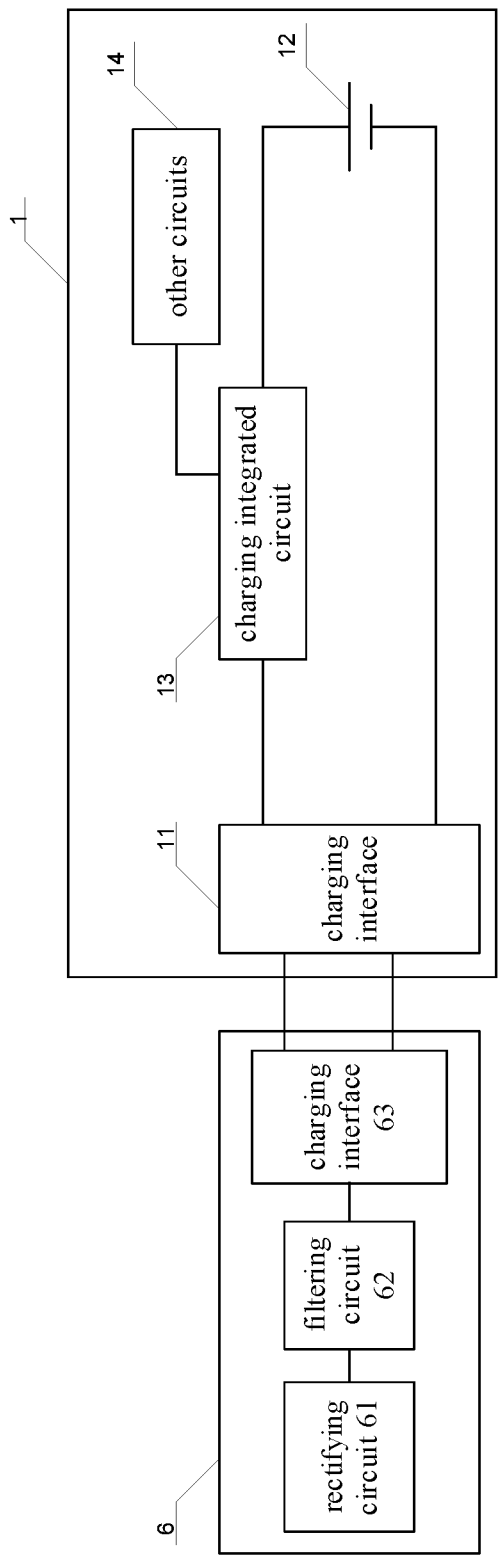
FIG. 1 is a schematic diagram of a device to be charged according to an example embodiment.

Example embodiments are described more fully with reference to the accompanying drawings. However, the example embodiments can be embodied in various forms and should not be construed as being limited to the examples set forth herein; rather, these embodiments are provided so that the disclosure is more complete to those skilled in the art. The drawings are only schematic diagrams of the disclosure, and are not necessarily to scale. The same reference numerals in the drawings denote the same or similar parts, and the repeated description thereof is omitted.

Furthermore, the described features, structures, or characteristics may be combined in any suitable manner in one or more embodiments. In the following description, numerous specific details are set forth to fully understand the embodiments disclosed. However, one skilled in the art will appreciate that one or more specific details may be omitted, and other methods, components, devices, steps, may be employed. In other instances, various aspects of the present disclosure may not be obscured without the details of the structure, method, apparatus, implementation, material, or operation.

In the present disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the present disclosure.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

First, a related adapter for charging a device to be charged in the related art is described.

In a case that the related adapter works in a constant-voltage mode, the output voltage of the adapter is basically constant, such as 5V, 9V, 12V or 20V. The output current of the adapter may be pulsating DC (direct current) (the direction of which is constant, but the amplitude varies with time), AC (alternating current) (both direction and amplitude vary with time), or constant DC (direction and amplitude of which do not change with time).

The voltage output by the adapter is not suitable to be directly applied to both ends of the battery, but needs to be converted by a conversion circuit in the device to be charged to obtain the charging voltage and/or charging current expected by the battery in the device to be charged.

Before introducing the controlling of the charging voltage and/or charging current of the battery through the conversion circuit, the charging process of the battery is introduced. The charging process of the battery may include: a trickle charging phase (or mode), a constant-current charging phase (or mode), a constant-voltage charging phase (or mode), and a supplemental charging phase (or mode). In the trickle charging phase, a fully-discharged battery is pre-charged (i.e., restoratively charged), and the trickle charging current is typically one tenth of the constant-current charging current. When the battery voltage rises above a trickle charging voltage threshold, the charging current is raised to enter the constant-current charging phase. In the constant-current charging phase, the battery is charged with the constant current, and the charging voltage rises rapidly. When the charging voltage reaches an expected charging voltage threshold of the battery, the constant-voltage charging phase is entered. During the constant-voltage charging phase, the battery is charged at the constant voltage, and the charging current is gradually decreased. When the charging current is reduced to a preset current threshold (which is usually one tenth of the charging current value in the constant-current charging phase or less, optionally, the current threshold can be tens of milliamps or less), the battery is fully charged. After the battery is fully charged, current loss occurs due to the self-discharge of the battery, and then the supplementary charging phase is entered. During the supplementary charging phase, the charging current is small, just to ensure that the battery is fully charged.

The conversion circuit can control the charging voltage and/or charging current of the battery during different charging phases. For example, in the constant-current charging phase, the conversion circuit can utilize a current feedback loop to make the magnitude of the current entering the battery meet the magnitude of the first charging current expected by the battery. In the constant-voltage charging phase, the conversion circuit can utilize a voltage feedback loop to make the magnitude of the voltage applied to both ends of the battery meet the magnitude of the charging voltage expected by the battery. In the trickle charging phase, the conversion circuit can utilize the current feedback loop to make the magnitude of the current entering the battery meet the magnitude of the second charging current expected by the battery (the second charging current is less than the first charging current).

For example, when the voltage output by the adapter is greater than the charging voltage expected by the battery, the conversion circuit is configured to perform a step-down conversion process on the voltage output by the adapter, so that the magnitude of the charging voltage obtained after the step-down conversion meets the magnitude of the charging voltage expected by the battery.

The "normal charging mode" and "fast charging mode" are described below. In the normal charging mode, a battery in a device to be charged is charged with relatively-small current (generally less than 2.5 A) output by the adapter or relatively-small power (generally less than 15 W). In the normal charging mode, it usually takes several hours to fully charge a large capacity battery (such as a 3000 mAh battery). In the fast charging mode, a battery in a device to be charged is charged with relatively-large current (generally greater than 2.5 A, such as 4.5 A, 5 A or higher) output by the adapter or relatively-large power (generally greater than or equal to 15 W). Compared to the normal charging mode, the charging speed of the adapter is faster in the fast charging mode, and the charging time required to fully charge the battery of the same capacity can be significantly shortened.

FIG. 1 is a schematic diagram of a device to be charged and a relevant adapter for charging the device to be charged according to an example embodiment. As illustrated in FIG. 1, the device 1 includes: a charging interface 11, a battery unit 12, a charging integrated circuit (IC) 13, and other circuits 14.

The device 1 can be charged by an adapter 6 of 10 W (5V/2 A). The adapter 6 charges the device 1 in the normal charging mode. The adapter 6 includes a rectifying circuit 61, a filtering circuit 62, and a charging interface 63. The rectifying circuit 61 is configured to convert input AC into DC, and the filtering circuit 62 is configured to perform a filtering operation on the DC outputted from the rectifying circuit 61 to provide stable DC to the device 1 coupled thereto through the charging interface 63. The battery unit 12 may be, for example, a single lithium battery cell, and a charging cutoff voltage of the single cell is generally 4.2V. Therefore, it is necessary to arrange the charging integrated circuit 13 for converting voltage of 5V into charging voltage suitable for the charging voltage expected by the battery unit 12. In addition, the charging integrated circuit 13 is also configured to supply power to other circuits 14 (such as a CPU or the like) inside the device 1.

Figure 2:
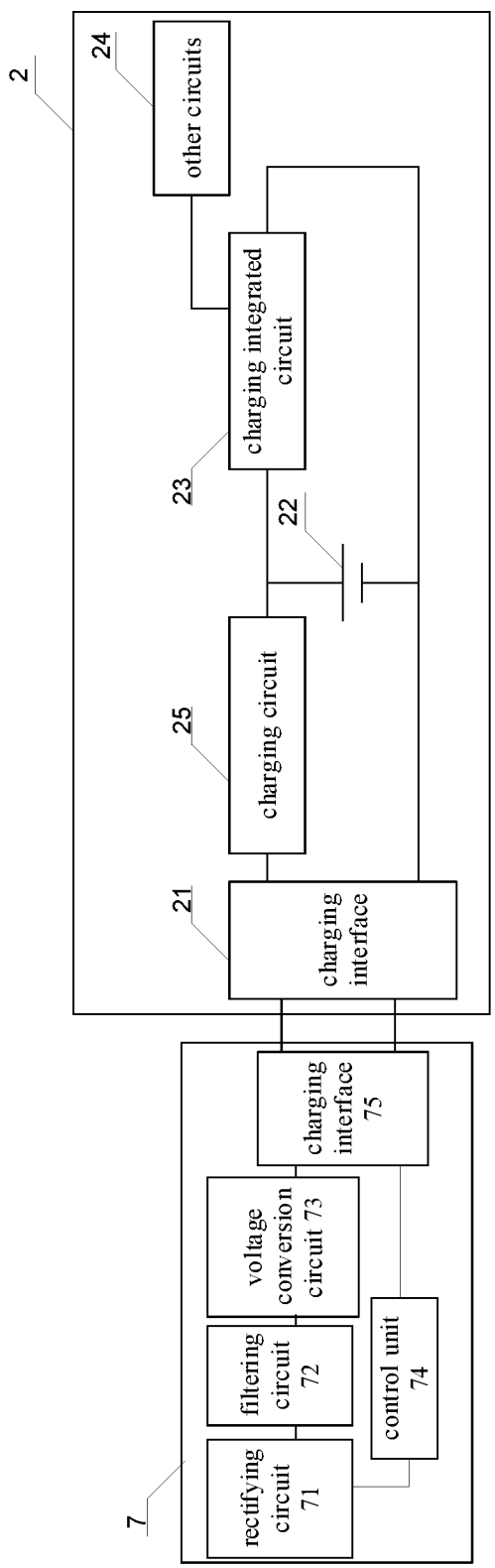
FIG. 2 is a schematic diagram of a device to be charged according to an example embodiment.

FIG. 2 is a schematic diagram of a device to be charged and a relevant adapter for charging the device to be charged according to an example embodiment. As illustrated in FIG. 2, the device 2 includes: a charging interface 21, a battery unit 22, a charging integrated circuit (IC) 23, other circuits 24, and a charging circuit 25.

The device 2 can be quickly charged by a high power adapter 7 of 20 W (5V/4 A), in other words, the adapter 7 charges the device 2 in the fast charging mode. The adapter 7 includes a rectifying circuit 71, a filtering circuit 72, a voltage conversion circuit 73, a control unit 74, and a charging interface 75. The rectifying circuit 71 is configured to convert input AC into DC. The filtering circuit 72 is configured to perform a filtering operation on the DC output from the rectifying circuit 71 to provide stable DC. The voltage conversion circuit 73 is configured to perform voltage conversion on the DC output from the filtering circuit 72. The voltage conversion circuit 73 is generally a step-down circuit for supplying DC of a suitable voltage to the device 2 coupled thereto through the charging interface 75. The control unit 74 is configured to receive feedback from the device 2 to control the voltage and/or current of the DC output from the rectifying circuit 71. The charging circuit 25 is coupled to the charging interface 21 and the battery unit 22 for charging the battery unit 22. The battery unit 22 is still shown, for example, by a lithium battery including a single lithium battery cell. Since the voltage conversion circuit 73 is provided in the adapter 7, the voltage output from the adapter 7 can be directly applied to both ends of the battery unit 22, that is, the charging circuit 25 charges the battery unit 22 in a direct charging manner, and the electric energy outputted by the adapter 7 is directly supplied to the battery unit 22 through the charging circuit 25 without voltage conversion. Optionally, the charging circuit 25 can be a switching circuit. The current output from the adapter 7 changes slightly in voltage drop after passing through the charging circuit 25 so as not to substantially affect the charging process of the battery unit 22. The charging integrated circuit 23 is configured to supply power to the other circuits 24 (such as a CPU or the like) inside the device 2.

In some embodiments, the adapter 7 can also provide the pulsating DC or the AC to charge the device 2. In order to realize the output of the pulsating DC or the AC of the adapter 7, in an embodiment, the foregoing filtering circuit 72 can be removed, so that the unfiltered current output by the rectifying circuit 71 can directly supply power to the device 2 after passing through the voltage conversion circuit 73 and the charging interface 75. Alternatively, the electrolytic capacitor included in the aforementioned filtering circuit 72 may be removed to achieve the output of the pulsating DC or the AC.

In addition, the charging integrated circuit 23 can also control the adapter to employ multi-stage constant-current charging in the constant-current charging phase. The multi-stage constant-current charging may have M constant-current phases (M is an integer no less than 2), and the multi-stage constant-current charging starts from a first phase charging with a preset charging current, and the M constant-current phases are executed sequentially from the first phase to the $M^{th}$ phase. When the previous constant-current phase in the constant-current phases is transferred to the next constant-current phase, the magnitude of the current may be decreased. When the battery voltage reaches a charging termination voltage threshold, the previous constant-current phase in the constant-current phases moves to the next constant-current phase. The current conversion process between two adjacent constant-current phases may be gradual or stepped.

For a device to be charged containing a single cell, when relatively-large charging current is used to charge the single cell, the heating phenomenon of the device to be charged is more serious. In order to ensure the charging speed of the device to be charged and to alleviate the heating phenomenon of the device to be charged during charging, the battery structure can be modified, and a plurality of cells coupled in series are used to be directly charged, in other words, the voltage output from the adapter is directly applied to both ends of the battery unit containing multiple cells. Compared with the single-cell solution (that is, the capacity of the single cell before the modifying is considered to be the same as the total capacity of the modified multiple cells coupled in series), if the same charging speed is achieved, the charging current required for the multiple cells is about 1/N of the charging current required for the single cell (N is the number of cells in series), in other words, multiple cells coupled in series can greatly reduce the magnitude of the charging current under the premise of ensuring the same charging speed, thereby further reducing the amount of heat generated by the device to be charged during charging.

Figure 3:
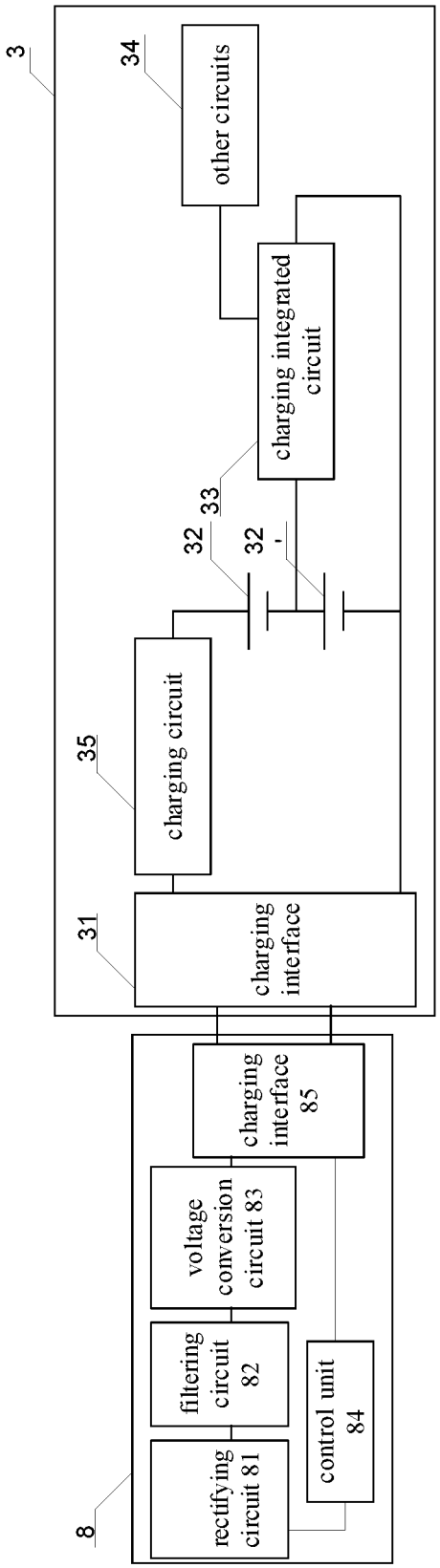
FIG. 3 is a schematic diagram of a device to be charged according to an example embodiment.

FIG. 3 is a schematic diagram of a device to be charged and a relevant adapter for charging the device to be charged according to an example embodiment. As illustrated in FIG. 3, the device 3 includes: a charging interface 31, a first battery unit 32, a second battery unit 32', a charging integrated circuit 33, other circuits 34 and a charging circuit 35.

The device 3 can be quickly charged by a high power adapter 8 of 50 W (10V/5 A), that is, the adapter 8 charges the device 3 in the fast charging mode. The adapter 8 includes a rectifying circuit 81, a filtering circuit 82, a voltage conversion circuit 83, a control unit 84, and a charging interface 85. The rectifying circuit 81 is configured to convert input AC into DC. The filtering circuit 82 is configured to filter the DC output from the rectifying circuit 81 to provide stable DC. The voltage conversion circuit 83 is configured to perform voltage conversion on the DC output from the filtering circuit 82 to provide DC power of a suitable voltage to the device 3 coupled thereto through the charging interface 85. The control unit 84 is configured to receive feedback of the device 3 to control the voltage and/or current of the DC output by the rectifying circuit 81. The first battery unit 32 is coupled in series with the second battery unit 32'. The first battery unit 32 and the second battery unit 32' are, for example, both lithium batteries including a single battery cell. The charging circuit 35 is coupled to the charging interface 31 and the first battery unit 32 and the second battery unit 32' coupled in series for charging the first battery unit 32 and the second battery unit 32'. The voltage output from the adapter 8 can be directly applied to both ends of the first battery unit 32 and the second battery unit 32' coupled in series, in other words, the charging circuit 35 directly charges the first battery unit 32 and the second battery unit 32' coupled in series in a direct charging manner. It should be noted that, since the charging circuit 35 charges the first battery unit 32 and the second battery unit 32' coupled in series in the direct charging manner, and the line impedance causes a voltage drop in the charging circuit, the output voltage output by the adapter 8 and received by the charging circuit 35 is required to be greater than the total voltage of the multiple cells included in the first battery unit 32 and the second battery unit 32'. In general, the operating voltage of a single cell is between 3.0V and 4.35V. Taking the dual cells coupled in series as an example, the output voltage of the adapter 8 can be set to be greater than or equal to 10V. The charging integrated circuit 33 is configured to supply power to other circuits 34 (such as a CPU or the like) inside the device 3.

Figure 4:
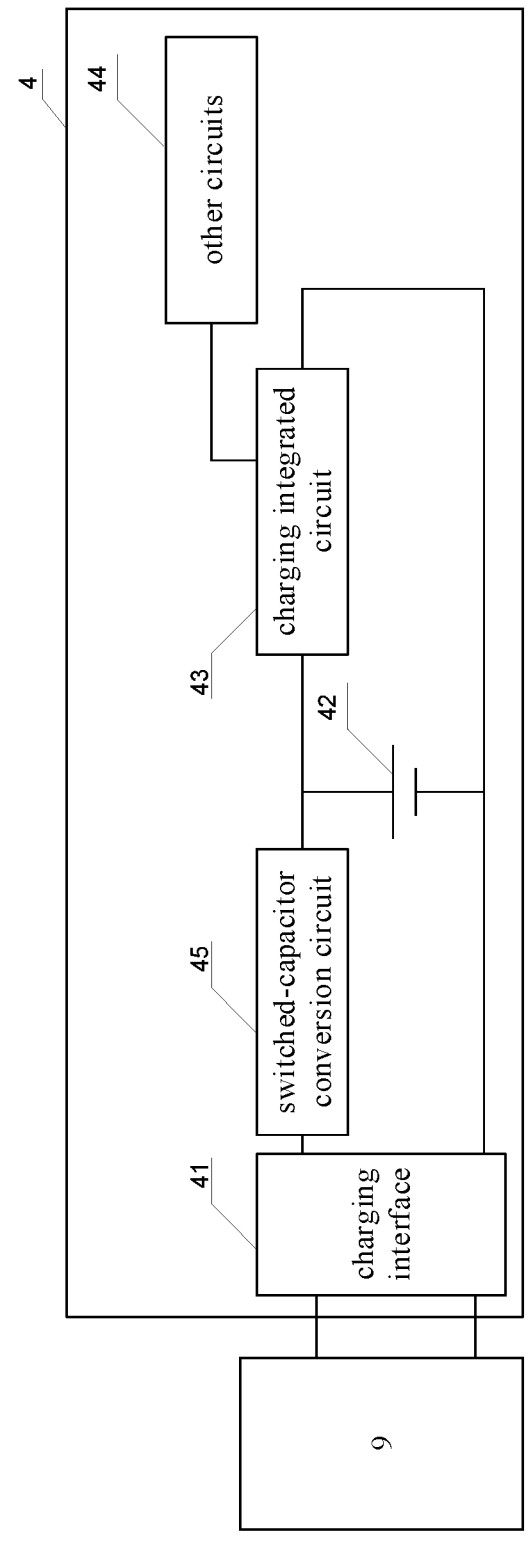
FIG. 4 is a schematic diagram of a device to be charged according to an example embodiment.
Figure 5:
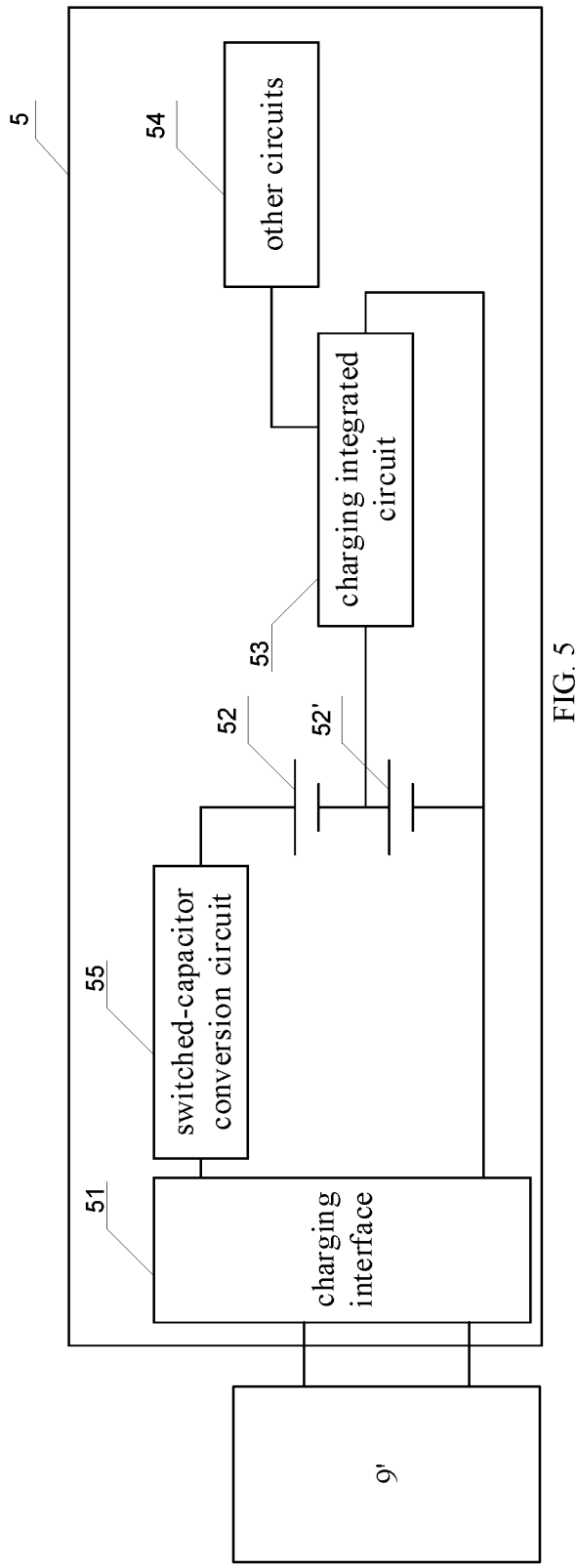
FIG. 5 is a schematic diagram of a device to be charged according to an example embodiment.

In order to realize fast charging, the fast charging technology scheme with high voltage and small current as shown in FIGS. 4 and 5 can be adopted.

FIG. 4 is a schematic diagram of a device to be charged according to an example embodiment. As illustrated in FIG. 4, the device 4 includes a charging interface 41, a battery unit 42, a charging integrated circuit 43, other circuits 44, and a switched-capacitor conversion circuit 45.

The device 4 can be quickly charged, for example, by an adapter 9 having maximum output voltage of 10 V and supporting only a single cell. The switched-capacitor conversion circuit 45 can be, for example, a switched-capacitor DC-DC converter. The switched-capacitor conversion circuit 45 is coupled to the charging interface 41 and the battery unit 42, and receives the voltage output from the adapter through the charging interface 41 to charge the battery unit 42. The battery unit 42 is still shown, for example, by a lithium battery including a single lithium battery cell. Since the output voltage of the adapter is 10 V, it cannot be directly loaded on both ends of the battery unit 42. Therefore, the switched-capacitor conversion circuit 45 is required as the charging circuit of the battery unit 42. The voltage output from the adapter is stepped down to meet the expected charging voltage of the battery unit 42. The charging integrated circuit 43 is configured to supply power to the other circuits 44 inside the device 4.

A device to be charged using a switched-capacitor conversion circuit can also use a battery in which a plurality of cells are coupled in series.

FIG. 5 is a schematic diagram of a device to be charged according to an example embodiment of the present disclosure. As shown in FIG. 5, the device 5 includes a charging interface 51, a first battery unit 52, a second charging unit 52', a charging integrated circuit 53, other circuits 54, and a switched-capacitor conversion circuit 55.

The device 5 can be quickly charged, for example, by an adapter 9' which supports double cells with maximum output voltage of 20V. The switched-capacitor conversion circuit 55 can be, for example, a switched-capacitor DC-DC converter. The switched-capacitor conversion circuit 55 is coupled to the charging interface 51 and the first battery unit 52 and the second charging unit 52' coupled in series, and the voltage output by the adapter is received through the charging interface 51 to charge the first battery unit 52 and the second charging unit 52' coupled in series. Both the first battery unit 52 and the second charging unit 52' are shown, for example, by a lithium battery including a single battery cell. Since the output voltage of the adapter is 20V, which is greater than the total voltage of the two cells in the first battery unit 52 and the second charging unit 52', the switched-capacitor conversion circuit 55 is required to perform step down on the voltage output from the adapter. The charging integrated circuit 53 is configured to supply power to the other circuits 54 inside the device 5.

A battery supply circuit, a device to be charged, and a charging control method according to the embodiments of the present disclosure are described as follows.

Figure 6:
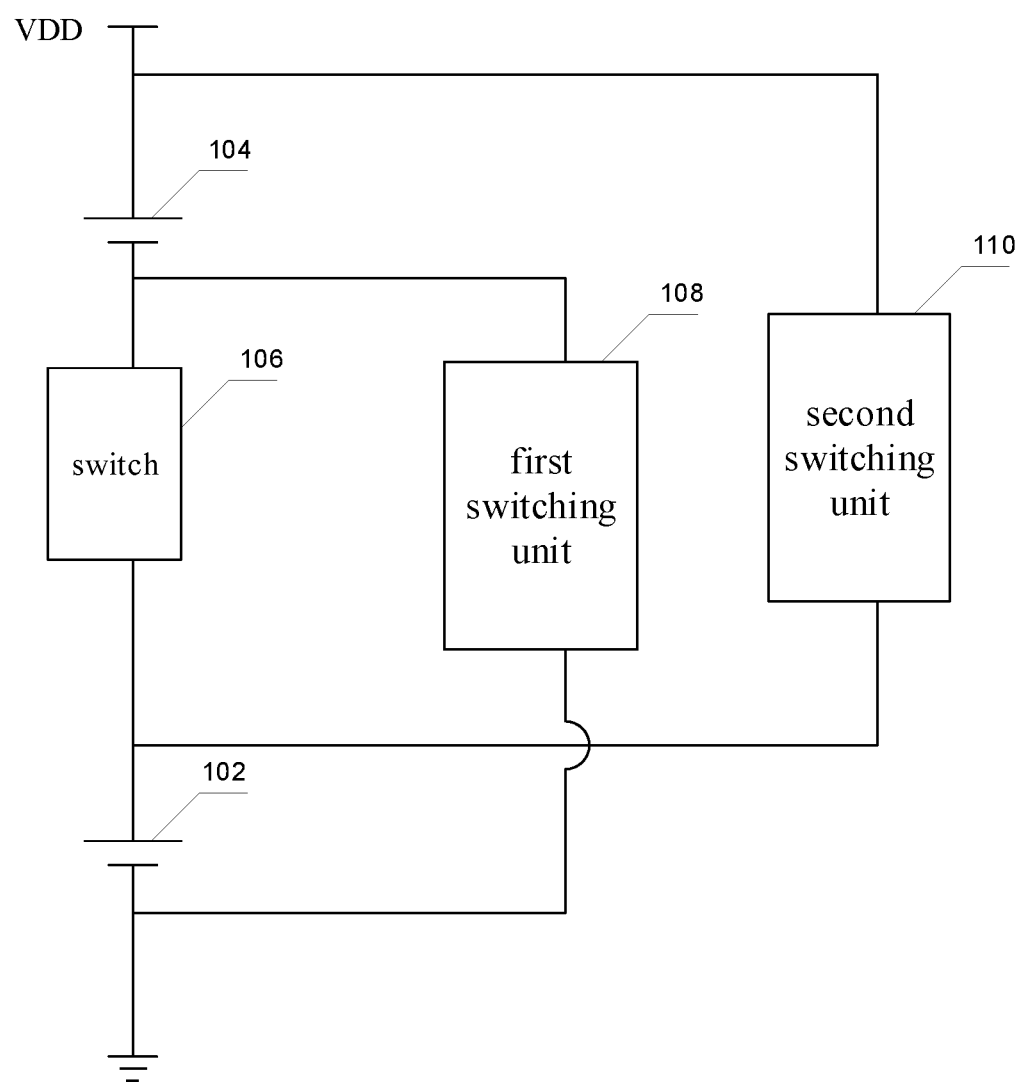
FIG. 6 is a schematic diagram of a battery supply circuit according to an example embodiment.

FIG. 6 is a schematic diagram of a battery supply circuit according to an example embodiment.

As illustrated in FIG. 6, the battery supply circuit 10 can be applied for a device to be charged (not shown in the figures), and includes a first cell 102, a second cell 104, a switch 106, a first switching unit 108, and a second switching unit 110.

A first end of the second cell 104 is coupled to a first end of the second switching unit 110, and a second end of the second cell 104 is coupled to a first end of the switch 106, a second end of the second switching unit 110 is coupled to a second end of the switch 106. A first end of the first cell 102 is coupled to the second end of the switch 106, a second end of the first cell 102 is coupled to a first end of the first switching unit 108, and a second end of the first switching unit 108 is coupled to the first end of the switch 106. In FIG. 6, the second end of the first cell 102 is taken as a grounding end, which is not limited in this disclosure.

In a case that the switch 106 is turned on, and the first switching unit 108 and the second switching unit 110 are in an off state, the first cell 102 and the second cell 104 are coupled in series, and in a case that the switch 106 is turned off, and the first switching unit 108 and the second switching unit 110 are in an on state, the first cell 102 and the second cell 104 are coupled in parallel.

Figure 7:
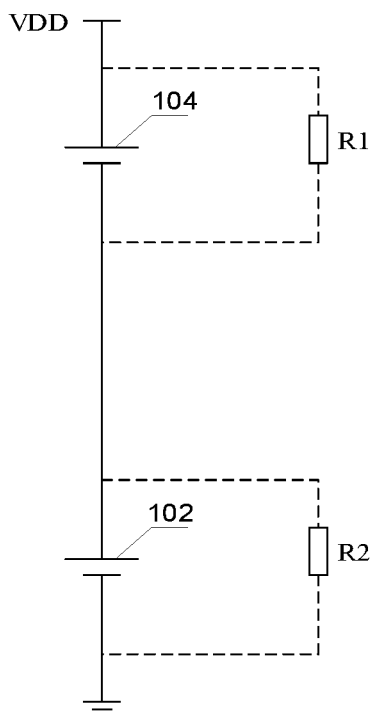
FIG. 7 is an equivalent circuit diagram of the battery supply circuit, in a case that the switch 106 is turned on and the first switching unit 108 and the second switching unit 110 are in an off state.
Figure 8:
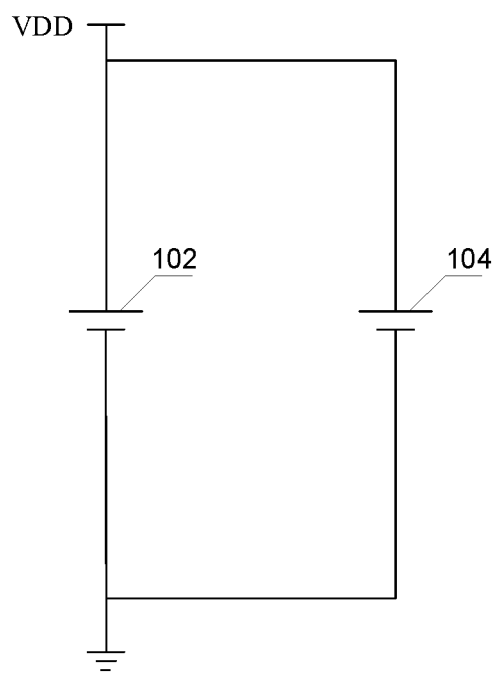
FIG. 8 is an equivalent circuit diagram of the battery supply circuit, in a case that the switch 106 is turned off and the first switching unit 108 and the second switching unit 110 are in an on state.

FIG. 7 is an equivalent circuit diagram of the battery supply circuit in a case that the switch 106 is turned on, and the first switching unit 108 and the second switching unit 110 are in an off state. FIG. 8 is an equivalent circuit diagram of the battery supply circuit in a case that the switch 106 is turned off and the first switching unit 108 and the second switching unit 110 are in an on state.

In some embodiments, the first cell 102 and the second cell 104 each may be a single cell or each may be multiple cells coupled in series.

In some embodiments, the first cell 102 and the second cell 104 may be cells in a plurality of cells included in the device to be charged.

In some embodiments, the first cell 102 and the second cell 104 may be packaged together in a battery cell or in two batteries.

The current device to be charged (or components in the device to be charged or chips in the device to be charged) generally adopts a single cell for power supply. Therefore, in a case that the first cell 102 and the second cell 104 are coupled in series for charging, if the first cell 102 or the second cell 104 is configured to supply power to the device to be charged (or the components in the device to be charged or the chips in the device to be charged), the cell for power supply continues to consume power, thus resulting in imbalanced voltage between the first cell 102 and the second cell 104 (or the voltages are inconsistent). The voltage imbalance between the first cell 102 and the second cell 104 reduces the overall performance of the first cell 102 and the second cell 104 and affects the service life of the first cell 102 and the second cell 104. In addition, the voltage imbalance between the first cell 102 and the second cell 104 may make it difficult to manage multiple cells in a unified manner. Therefore, the battery supply circuit according to the embodiment of the present disclosure also introduces an equalization circuit: a first switching unit 108 and a second switching unit 110.

In some embodiments, the first switching unit 108 and the second switching unit 110 are semiconductor switches (e.g., MOS tubes, and CMOS tubes). At the end of charging, if the voltage difference between the first cell 102 and the second cell 104 is greater than a first voltage difference threshold, the first switching unit 108 and the second switching unit 110 work in an equilibrium state, and the first switching unit 108 and/or the second switching unit 110 can be controlled to operate in a linear region to provide a current-limiting resistor (refer to the current-limiting resistors R1 and R2 in FIG. 7), thereby reducing the voltage difference between the first cell 102 and the second cell 104 to prevent large current from damaging the battery when the voltage difference between the two is large. When the voltage difference between the first cell 102 and the second cell 104 is less than a second voltage difference threshold (the second voltage difference threshold is less than the first voltage difference threshold) through equalization, the first switching unit 108 and the second switching unit 110 are completely turned on, so that the first cell 102 and the second cell 104 are coupled in parallel.

According to the battery supply circuit provided by the embodiments of the present disclosure, a plurality of charging connection modes can be provided in the device to be charged through switch control. For example, when the first cell 102 and the second cell 104 are coupled in parallel for charging, both the normal charging scheme as shown in FIG. 1 and the fast charging scheme as shown in FIG. 2 or FIG. 4 are applicable for charging. When the first cell 102 and the second cell 104 are coupled in series for charging, the fast charging scheme shown in FIG. 3 or FIG. 5 is applicable for charging.

Figure 9:
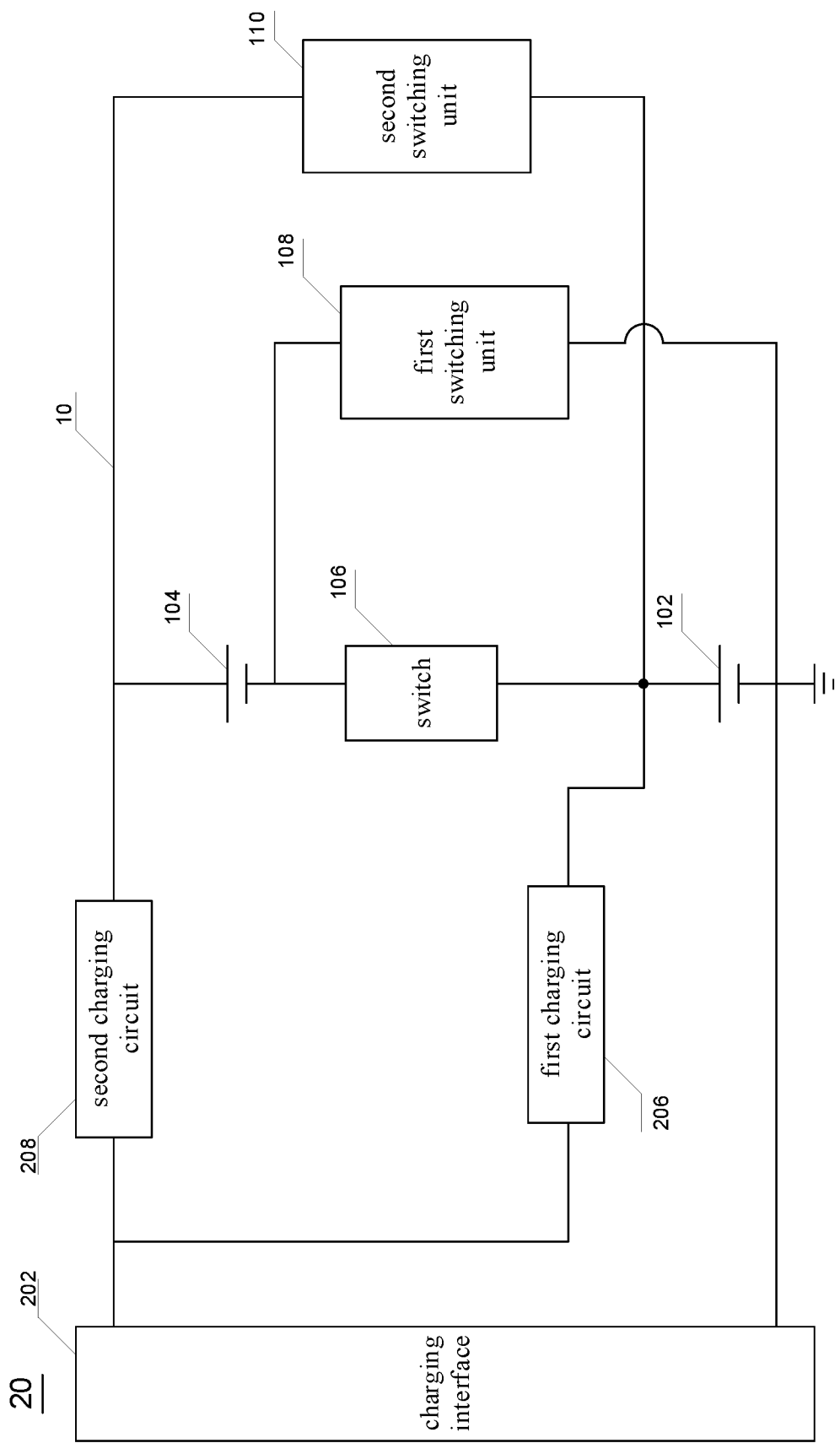
FIG. 9 is a schematic diagram of a device to be charged according to an example embodiment.

FIG. 9 is a schematic diagram of a device to be charged according to an example embodiment.

The device 20 shown in FIG. 9 may be, for example, a terminal or a communication terminal, which includes but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of mobile terminals include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver.

The device 20 includes the battery supply circuit 10 as shown in FIG. 6 described above, a charging interface 202, a first charging circuit 206, and a second charging circuit 208.

It should be noted that, the embodiment of the present disclosure does not specifically limit the type of the charging interface 202. For example, the charging interface 202 may be a Universal Serial Bus (USB) interface. The USB interface may be a standard USB interface, a micro USB interface or a Type-C interface. The first charging circuit 206 and/or the second charging circuit 208 can charge the first cell 102 and the second cell 104 through a power line in the USB interface. The power line in the USB interface can be a VBus line and/or a ground line in the USB interface.

Figure 10:
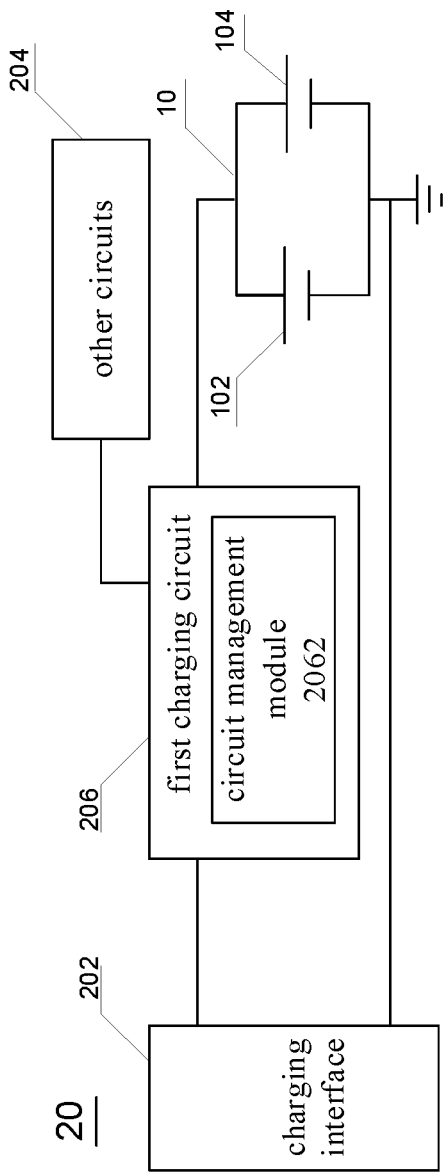
FIG. 10 is a circuit diagram in a case that a device 20 to be charged is charged by a first charging circuit 206 in a first charging mode according to an example embodiment.

FIG. 10 is a circuit diagram in a case that a device 20 to be charged is charged by a first charging circuit 206 in a first charging mode according to an example embodiment.

As shown in FIG. 9 and FIG. 10, FIG. 10 is a circuit diagram, in a case that the switch 106 shown in FIG. 9 is turned off, and the device 20 is charged by the first charging circuit 206 in the first charging mode. The first charging mode may be, for example, the normal charging mode as shown in FIG. 1.

The first charging circuit 206 can, for example, adopt a conventional charging circuit design, that is, a conversion circuit (such as a charging integrated circuit) is provided between the charging interface 202 and the first end of the first cell 102, so that the first cell 102 and the second cell 104 coupled in parallel can be charged. The conversion circuit can perform constant voltage and constant current control on the charging process of the adapter (such as the adapter 6 shown in FIG. 1) for charging the device 20, and modulate the output voltage of the adapter according to actual needs, such as step-down. In some embodiments, the charging integrated circuit may be, for example, a Buck circuit.

In some embodiments, the first charging circuit 206 is also configured to supply power to other circuits 204 of the device 20, and may include a circuit management module 2062 for managing a charging circuit of the first cell 102 and the second cell 104 and a charging circuit for supplying power to the other circuits.

In the normal charging mode provided by the first charging circuit 206, the adapter outputs a relatively-small current value or uses relatively-small power to charge the first cell 102 and the second cell 104 coupled in parallel in the device 20.

Figure 11:
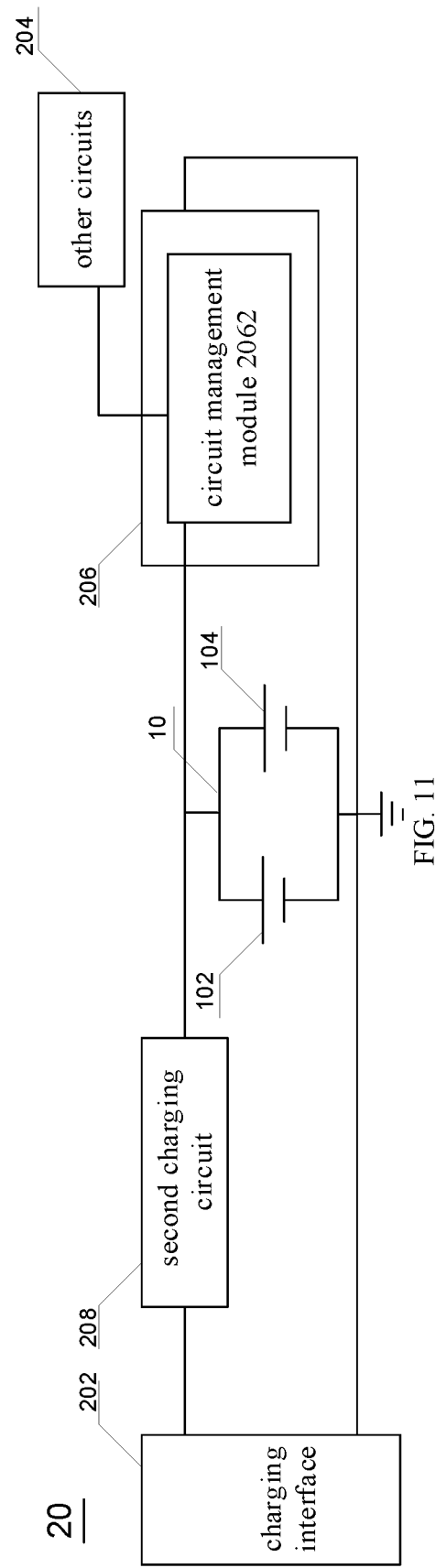
FIG. 11 is a circuit diagram in a case that a device 20 to be charged is charged by a second charging circuit 208 in a second charging mode according to an example embodiment.
Figure 12:
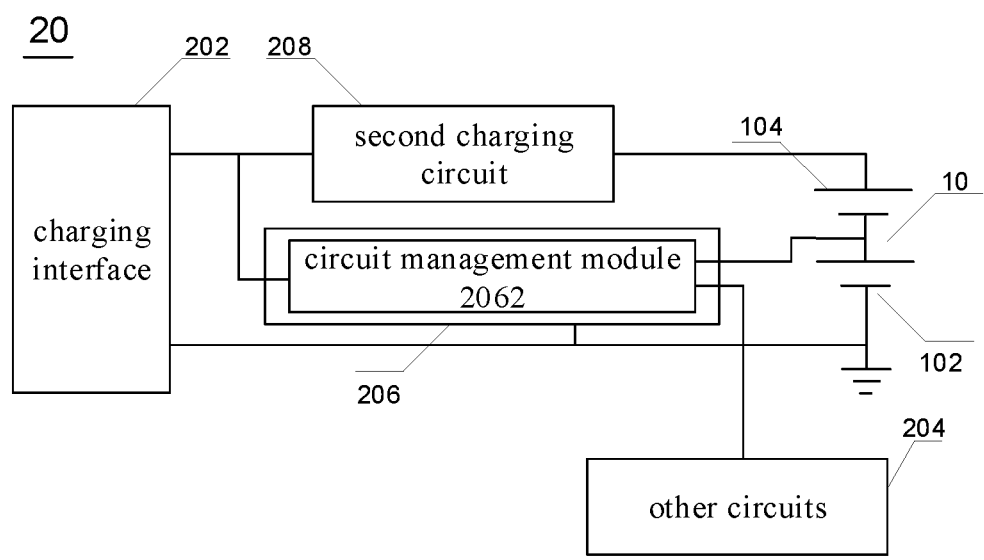
FIG. 12 is a circuit diagram in a case that a device 20 to be charged is charged by a second charging circuit 208 in a third charging mode according to an example embodiment.

FIG. 11 is a circuit diagram in a case that a device 20 to be charged is charged by a second charging circuit 208 in a second charging mode according to an example embodiment. FIG. 12 is a circuit diagram in a case that a device 20 is charged by a second charging circuit 208 in a third charging mode according to an example embodiment.

As illustrated in FIG. 9 and FIG. 11, FIG. 11 is a circuit diagram in a case that the switch 106 shown in FIG. 9 is turned off, and the device 20 is charged by the second charging circuit 208 in the second charging mode. The second charging mode may be, for example, the fast charging mode shown in FIG. 2, that is, a high-power charging scheme of 20 W (5V/4 A). In the second charging mode provided by the second charging circuit 208, the second charging circuit 208 may adopt a direct charging manner as shown in FIG. 2 to charge the first cell 102 and the second cell 104 coupled in parallel.

As illustrated in FIG. 9 and FIG. 12, FIG. 12 is a circuit diagram in a case that the switch 106 shown in FIG. 9 is turned off, and the device 20 is charged by the second charging circuit 208 in the third charging mode. The third charging mode may be, for example, the fast charging mode shown in FIG. 3, that is, a high-power charging solution of 50 W (10V/5 A). In the third charging mode provided by the second charging circuit 208, the second charging circuit 20 may adopt a direct charging manner as shown in FIG. 3 to charge the first cell 102 and the second cell 104 coupled in series.

The connection manner of the first cell 102 and the second cell 104 can be controlled, for example, based on a switch or a control unit. The switch or control unit can be flexibly switched between serial connection mode and parallel connection mode according to the actual needs (such as the type of adapter coupled).

In addition, as shown in FIG. 12, in a case that the third charging mode is adopted to charge the first cell 102 and the second cell 104 through the second charging circuit 206, the first charging circuit 206 is further configured to directly draw energy from the adapter to supply power to the other circuits 204 of the device 20; or, the electric energy output by a positive electrode of the first cell 102 can also be used to power the other circuits 204 through the first charging circuit 206.

It should be noted that, in order to simplify the circuit diagram, the equalization circuits in the first cell 102 and the second cell 104 are not shown in FIG. 12, but those skilled in the art should understand that when the series charging of the device 20 is completed, the device 20 shown in FIG. 12 is configured to reduce the voltage difference between the first cell 102 and the second cell 104 according to the above-mentioned equalization method through the first switching unit 108 and the second switching unit 110 before the first cell 102 and the second cell 104 are coupled in parallel.

Figure 13:
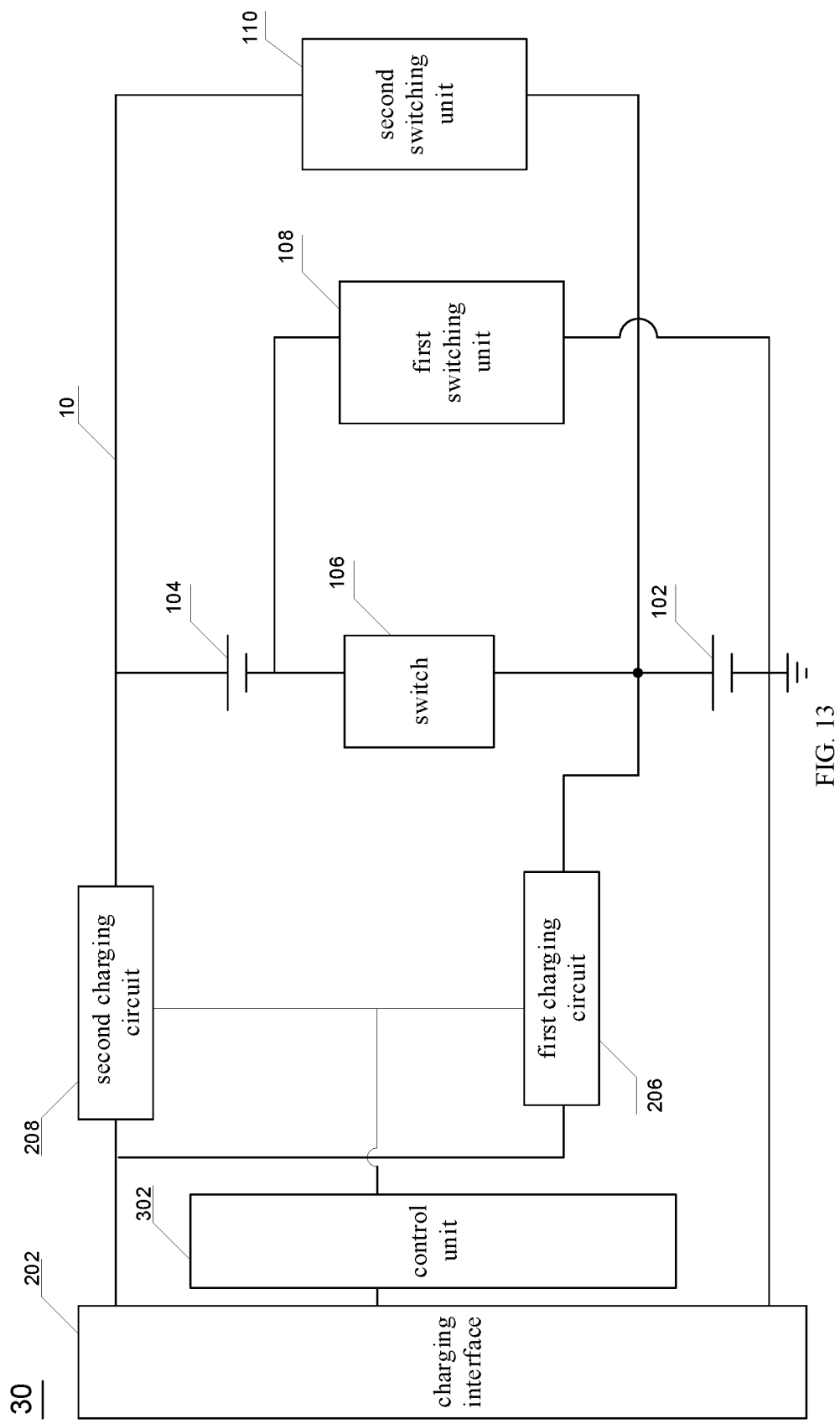
FIG. 13 is a schematic diagram of a device to be charged according to an example embodiment.

FIG. 13 is a schematic diagram of a device to be charged according to an example embodiment.

As illustrated in FIG. 13, the difference between the device 30 and the device 20 shown in FIG. 9 is that the device 30 further includes: a control unit 302.

The control unit 302 may perform bidirectional communication with the adapter for charging the device 30 through a data line in a cable coupled to the charging interface 202 to negotiate a charging mode between the adapter and the device 30. In addition, the control unit 302 is further configured to control a connection between the first cell 102 and the second cell 104, that is, the on and off of the control switch 106, and the status or work area of the first switching unit 108 and the second switching unit 110.

Taking the charging interface 202 as a USB interface as an example, the data line may be a D+ line and/or a D− line in the USB interface.

It should be noted that the above description of the present disclosure does not limit the master-slave nature of the adapter and the control unit 302. In other words, any one of the adapter and the control unit 302 can initiate a bidirectional communication session as the master device. Accordingly, the other party may act as a slave device to make a first response or a first reply to the communication initiated by the master device. As a feasible method, during the communication process, the identity of the master and slave devices can be confirmed by comparing the electrical level of the adapter side and the side of the device to be charged with respect to the ground.

The present disclosure does not limit the specific implementation of the bidirectional communication between the adapter and the control unit 302, that is, any one of the adapter and the control unit 302 can initiate a communication session as the master device, and accordingly the other party acts as the slave device to make a first response or a first reply to the communication initiated by the master device, and at the same time, the master device can make a second response to the first response or the first reply of the slave device, and it can be considered that a negotiation process of a charging mode between the master device and the slave device are completed (also called a "bidirectional communication" process between the master device and the slave device). As a feasible implementation mode, the master device and the slave device can perform the charging operation between the master device and the slave device after the negotiation of multiple charging modes is completed to ensure that the negotiated charging process is safely and reliably executed.

A first way in which the master device makes the second response to the first response or first reply to the communication session according to the policy of the slave device can be: the master device can receive the first response or first reply made by the slave device for the communication session, and make a targeted second response based on the received first response or first reply of the slave device. For example, when the master device receives the first response or first response of the slave device for the communication session within a preset time, the master device responds to the first response or first response of the slave device through the targeted second response. Specifically, the master device and the slave device have completed a negotiation of the charging mode, and the master device and the slave device perform a charging operation in the first charging mode or the second charging mode according to a negotiation result. That is, the adapter works in the first charging mode or the second charging mode to charge the device to be charged according to the negotiation result.

A second way in which the master device makes the second response to the first response or first reply to the communication session according to the policy of the salve device can be: the master device does not receive the first response or first reply from the slave device for the communication session within the preset time, and the master device also makes a targeted second response to the first response or first reply of the slave device. For example, when the master device does not receive the first response or first reply of the slave device for the communication session within the preset time, the master device side also respond to the first response or the first response of the slave device through the targeted second response. Specifically, the master device and the slave device have completed the negotiation of a charging mode, and the master device and the slave device perform a charging operation in the first charging mode, that is, the adapter works in the first charging mode to charge the device to be charged.

When the device 30 to be charged initiates a communication session as a master device, and the adapter as a slave device makes a first response or first reply to the communication session initiated by the master device, there is no need for the device 20 to be charged to respond to the first response or first reply made by the adapter with a targeted second response, it is considered that the adapter and the device 30 to be charged have completed the negotiation of a charging mode, and it can be further determined according to the negotiation result that the first cell 102 and the second cell 104 are charged by the first charging circuit 206 or the second charging circuit 208.

In some embodiments, the control unit 302 performs bidirectional communication with the adapter through a data line to negotiate a charging mode between the adapter and the device to be charged. In detail, the control unit 302 receives a first instruction sent by the adapter, and the first instruction is configured to query whether the device 30 turns on a third charging mode. The control unit 302 sends a reply instruction of the first instruction to the adapter, and the reply instruction of the first instruction is configured to indicate whether the device 30 agrees to turn on the third charging mode. In a case that the device 30 agrees to turn on the third charging mode, the control unit 302 is further configured to control the adapter to charge the first cell 102 and the second cell 104 through the second charging circuit 208, and control the first cell 102 and the second cell 104 to be coupled in series, and control the first charging circuit 206 to be coupled to the adapter, so that the first charging circuit 206 draws energy from the adapter when supplying power to other circuits of the device 30.

In some embodiments, the control unit 302 performs bidirectional communication with the adapter through a data line to negotiate a charging mode between the adapter and the device to be charged. In detail, the control unit 302 receives a second instruction sent by the adapter, and the second instruction is configured to query whether the device 30 turns on a second charging modes. The control unit 302 sends a reply instruction of the second instruction to the adapter, and the reply instruction of the second instruction is configured to indicate whether the device 30 agrees to turn on the second charging mode. In the case that the device 30 agrees to turn on the second charging mode, the control unit 302 is further configured to control the adapter to charge the first cell 102 and the second cell 104 through the second charging circuit 208, and control the first cell 102 and the second cell 104 to be coupled in parallel.

In some embodiments, the control unit 302 performs bidirectional communication with the adapter through a data line to negotiate a charging mode between the adapter and the device to be charged. In detail, according to the first instruction, the reply instruction of the first instruction, the second instruction and the reply instruction of the second instruction, in the case where the device 30 neither agrees to turn on the second charging mode nor agrees to turn on the third charging mode, the control unit 302 is also configured to control the adapter to charge the first cell 102 and the second cell 104 through the first charging circuit 206, and control the first cell 102 and the second cell 104 to be coupled in parallel.

Figure 14:
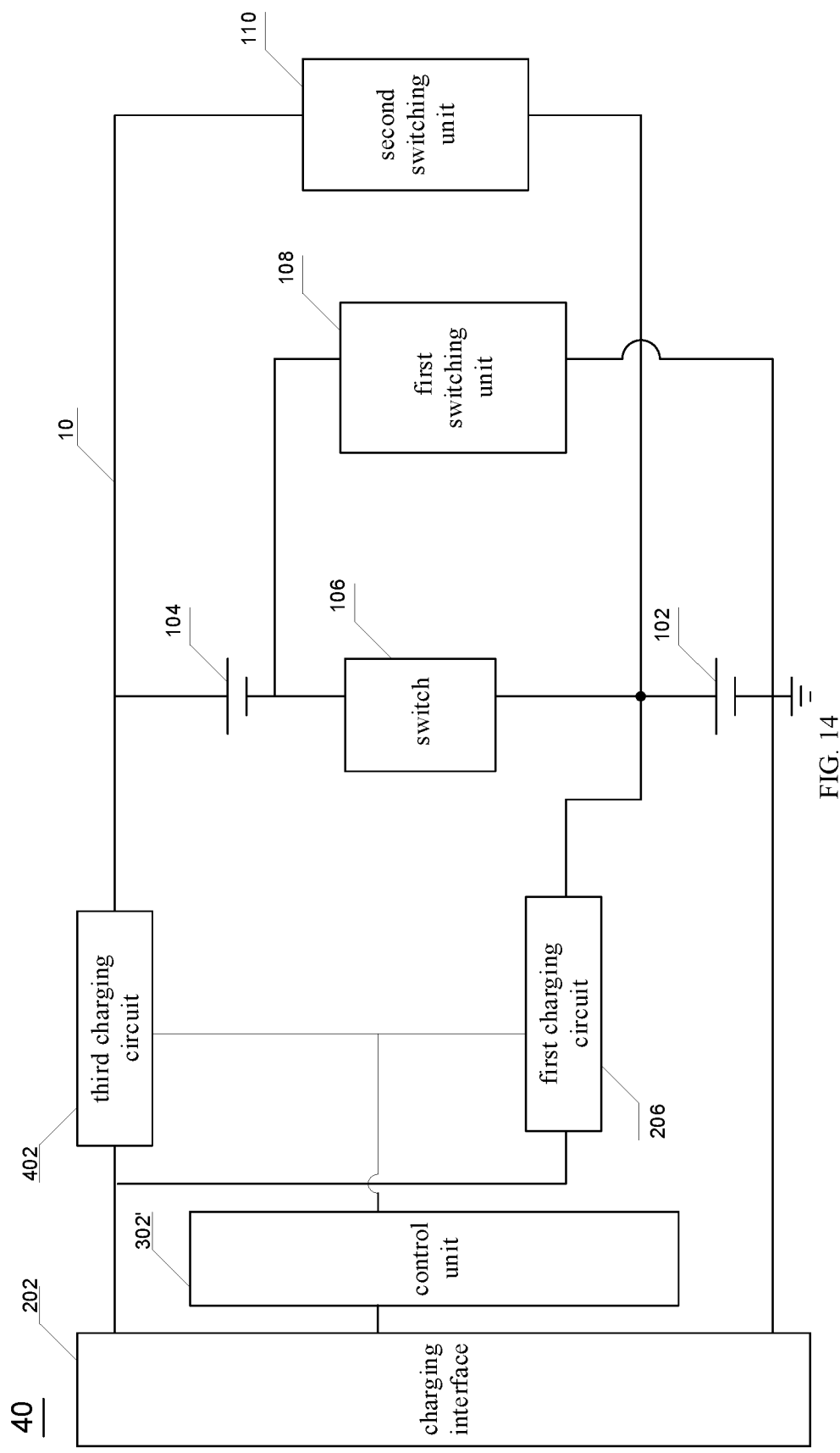
FIG. 14 is a schematic diagram of a device to be charged according to an example embodiment.

FIG. 14 is a schematic diagram of a device to be charged according to an example embodiment.

As illustrated in FIG. 14, the device 40 includes the battery supply circuit 10, the charging interface 202, and the first charging circuit 206 as shown in FIG. 6 described above, and a third charging circuit 402.

Figure 15:
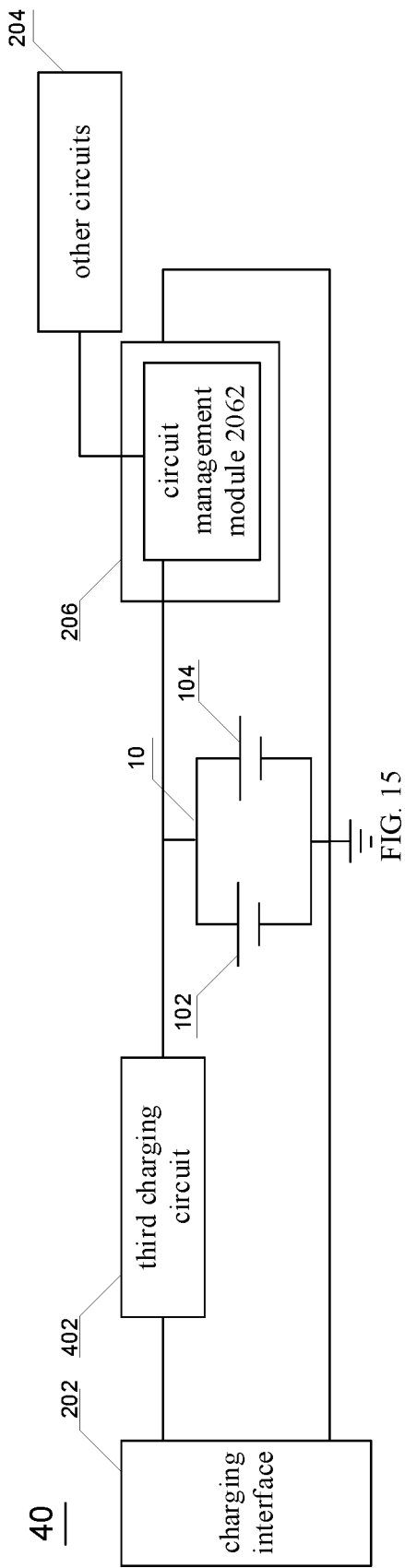
FIG. 15 is a circuit diagram in a case that a device 40 to be charged is charged by a third charging circuit 402 in a fourth charging mode according to an example embodiment.
Figure 16:
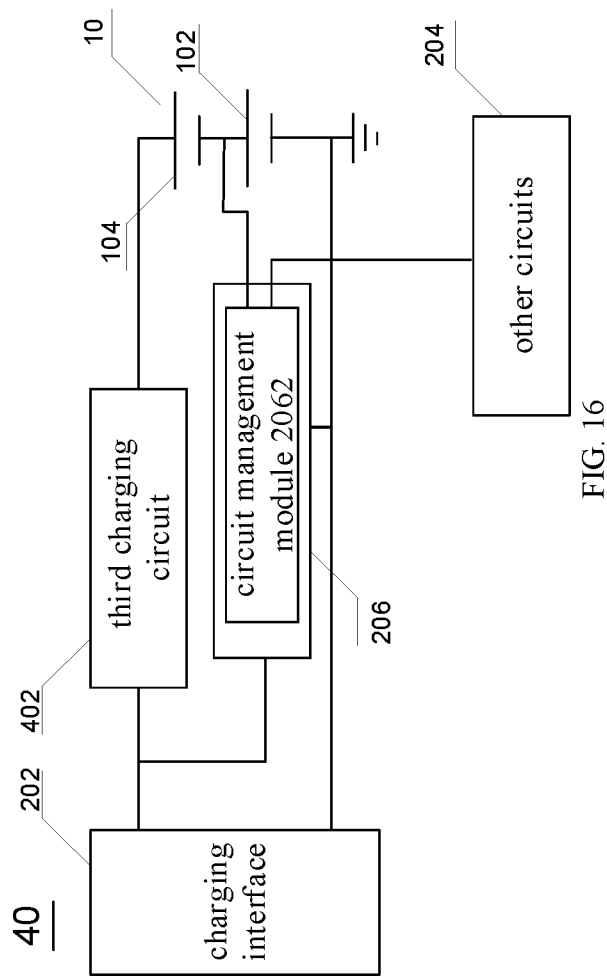
FIG. 16 is a circuit diagram in a case that a device 40 to be charged is charged by a third charging circuit 402 in a fifth charging mode according to an example embodiment.

FIG. 15 is a circuit diagram in a case that the device 40 is charged by a third charging circuit 402 in a fourth charging mode according to an example embodiment. FIG. 16 is a circuit diagram in a case that the device 40 is charged by a third charging circuit 402 in a fifth charging mode according to an example embodiment.

As illustrated in FIG. 14 and FIG. 15, FIG. 15 is a circuit diagram in a case that the switch 106 shown in FIG. 14 is turned off, and the device 40 is charged by the third charging circuit 402 in the fourth charging mode. The fourth charging mode may be, for example, the fast charging mode shown in FIG. 4, that is, a high-power charging scheme with an adapter output voltage of 10V. In the fourth charging mode provided by the third charging circuit 402, the third charging circuit 402 includes, for example, a switched-capacitor DC-DC converter, and adopts a charging method as shown in FIG. 4, to charge the first cell 102 and the second cell 104 in parallel.

As illustrated in FIG. 14 and FIG. 16, FIG. 16 is a circuit diagram in a case that the switch 106 shown in FIG. 14 is turned off, and the device 40 is charged by the third charging circuit 402 in the fifth charging mode. The fifth charging mode may be, for example, the fast charging mode shown in FIG. 5, that is, a high-power charging scheme with an adapter output voltage of 20V. In the fifth charging mode provided by the third charging circuit 402, the third charging circuit 402 includes, for example, a switched-capacitor DC-DC converter, which adopts a charging method shown in FIG. 5 to charge the first cell 102 and the second cell 104 coupled in series.

It should be noted that, in order to simplify the circuit diagram, the equalization circuit in the first cell 102 and the second cell 104 is not shown in FIG. 16, but those skilled in the art should understand that when the series charging is completed, the device 40 shown in FIG. 16 is configured to reduce the voltage difference between the first cell 102 and the second cell 104 according to the above-mentioned equalization method above-mentioned the first switching unit 108 and the second switching unit 110 before the first cell 102 and the second cell 104 are coupled in parallel.

In some embodiments, the device 40 further includes a control unit 302'. Bidirectional communication is performed between the control unit 302' and the adapter through a data line to negotiate the charging mode between the adapter and the device to be charged. In detail, the control unit 302' receives a third instruction sent by the adapter, and the third instruction is configured to query whether the device 30 turns on the fifth charging mode. The control unit 302' sends a reply instruction of the third instruction to the adapter, and the reply instruction of the third instruction is configured to indicate whether the device 30 agrees to turn on the fifth charging mode. In the case where the device 30 agrees to turn on the fifth charging mode, the control unit 302' is further configured to control the adapter to use the switched-capacitor converter 402 to charge the first cell 102 and the second cell 104, and to control the first cell 102 and the second cell 104 to be coupled in series.

In some embodiments, bidirectional communication is performed between the control unit 302' and the adapter through a data line to negotiate the charging mode between the adapter and the device to be charged. In detail, the control unit 302' receives a fourth instruction sent by the adapter, and the fourth instruction is configured to query whether the device 30 turns on the fourth charging mode. The control unit 302' sends a reply instruction of the fourth instruction to the adapter, and the reply instruction of the fourth instruction is configured to indicate whether the device 30 agrees to turn on the fourth charging mode. In the case where the device 30 agrees to turn on the fourth charging mode, the control unit 302' is further configured to control the adapter to use the switched-capacitor converter 402 to charge the first cell 102 and the second cell 104, and to control the first cell 102 and the second cell 104 to be coupled in parallel.

The device to be charged according to the present disclosure may provide the battery supply circuit, and the battery supply circuit is capable of accommodating various charging schemes, e.g., a normal charging mode and a fast charging mode, a flash charging mode (e.g., the second charging mode described above) and a super-flash charging mode (e.g., the third charging mode described above) in the fast charging mode. Moreover, for different charging modes, power may be supplied through two batteries that can be coupled in parallel or charging integrated circuit in the device to be charged. This manner does not cause loss by power conversion, and can further improve the cruising ability of the device to be charged. In addition, based on the bidirectional communication with the adapter, the device to be charged can automatically switch to different charging modes according to the type of the adapter, which can improve the using experience of the user.

It should be noted that the block diagrams shown in the above drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The following are method embodiments of the present disclosure. For details not disclosed in the method embodiments of the present disclosure, please refer to the device embodiments of the present disclosure.

FIG. 17 is a flowchart of a charging control method according to an example embodiment. The charging method is used for charging a device to be charged. The device to be charged includes: a charging interface and any one of the power supply circuits 20, 30, or 40 described above.

As illustrated in FIG. 17, the charging control method 50 includes the following acts.

At block S502, the switch in the supply circuit is turned on and the first switching unit and the second switching unit in the supply circuit are caused to be in an off state in response to receiving a first control instruction, such that the first cell and the second cell are coupled in series in the supply circuit.

At block S504, the switch is turned off and the first switching unit and the second switching unit are caused to be in an on state in response to receiving a second control instruction, such that the first cell and the second cell are coupled in parallel.

In some embodiments, the charging control method 50 includes: in a case that the first cell and the second cell are coupled in series for charging, after the charging is completed, determining whether a voltage difference between the first cell and the second cell is greater than a first voltage difference threshold; in response to that the voltage difference between the first cell and the second cell is greater than the first voltage difference threshold, controlling the first switching unit and/or the second switching unit to operate in a linear region to provide a current-limiting resistor for the first cell and/or the second cell; and in response to that the voltage difference between the first cell and the second cell is less than a second voltage difference threshold, controlling the first switching unit and the second switching unit to operate in a conducting state; and in which the second voltage difference threshold is less than the first voltage difference threshold.

In some embodiments, the charging control method 50 includes: receiving an output voltage and an output current of an adapter through the charging interface.

In some embodiments, the device to be charged includes: a charging integrated circuit. The method further includes: causing the battery supply circuit to supply power to other circuits of the device to be charged by the charging integrated circuit.

In some embodiments, the charging control method 50 includes: converting the output voltage by the charging integrated circuit, and applying the converted output voltage on both ends of the first cell and the second cell coupled in parallel in the battery supply circuit.

In some embodiments, the charging control method 50 includes: directly applying the output voltage and the output current on both ends of the first cell and the second cell coupled in series in the battery supply circuit, or directly applying the output voltage and the output current on both ends of the first cell and the second cell coupled in parallel in the battery supply circuit.

In some embodiments, the charging control method 50 includes: in response to directly applying the output voltage and the output current on both ends of the first cell and the second cell coupled in series, supplying power to the other circuits by the charging integrated circuit using voltage on the first cell.

In some embodiments, the charging control method 50 includes: in response to directly applying the output voltage and the output current on both ends of the first cell and the second cell coupled in series, drawing energy from the adapter to charge the other circuits by the charging integrated circuit.

In some embodiments, the adapter supports a first charging mode, a second charging mode, and a third charging mode; in the first charging mode, the charging integrated circuit applies the converted output voltage on both ends of the first cell and the second cell coupled in parallel in the battery supply circuit; in the second charging mode, the charging integrated circuit directly applies the output voltage and the output current on both ends of the first cell and the second cell coupled in parallel in the battery supply circuit; and in the third charging mode, the charging integrated circuit directly applies the output voltage and the output current on both ends of the first cell and the second cell coupled in series in the battery supply circuit.

In some embodiments, the charging interface includes a data line, and the method further includes: performing bidirectional communication with the adapter through the data line to negotiate the charging mode between the adapter and the device to be charged.

In some embodiments, performing bidirectional communication with the adapter through the data line to negotiate the charging mode between the adapter and the device to be charged, includes: receiving a first instruction sent by the adapter, in which the first instruction is configured to query whether the device to be charged turns on the third charging mode; and sending a reply instruction of the first instruction to the adapter, in which the reply instruction of the first instruction is configured to indicate whether the device to be charged agrees to turn on the third charging mode.

In some embodiments, the charging control method 50 includes: in response to that the device to be charged agrees to turn on the third charging mode, sending the first control instruction.

In some embodiments, performing bidirectional communication with the adapter through the data line to negotiate the charging mode between the adapter and the device to be charged, includes: receiving a second instruction sent by the adapter, in which the second instruction is used to query whether the device to be charged turns on the second charging mode; and sending a reply instruction of the second instruction to the adapter, in which the reply instruction of the second instruction is in response to that to indicate whether the device to be charged agrees to turn on the second charging mode.

In some embodiments, the charging control method 50 includes: in response to that the device to be charged agrees to turn on the second charging mode, sending the second control instruction.

In some embodiments, the device to be charged further includes a switched-capacitor converter, and the method further includes: converting the output voltage by the switched-capacitor converter, and directly applying the converted output voltage on both ends of the first cell and the second cell coupled in series in the battery supply circuit, or directly applying the converted output voltage on both ends of the first cell and the second cell coupled in parallel in the battery supply circuit.

In some embodiments, the charging control method 50 includes: in a case that the switched-capacitor converter directly applies the output voltage and the output current on both ends of the first cell and the second cell coupled in series, charging the other circuits by the charging integrated circuit using voltage on the first cell.

In some embodiments, the charging control method 50 includes: in a case that the switched-capacitor converter directly applies the output voltage and the output current on both ends of the first cell and the second cell coupled in series, drawing energy from the adapter to charge the other circuits by the charging integrated circuit.

In some embodiments, the adapter supports a fourth charging mode and a fifth charging mode; in the fourth charging mode, the switched-capacitor converter applies the converted output voltage on both ends of the first cell and the second cell coupled in parallel in the battery supply circuit; in the fifth charging mode, the switched-capacitor converter applies the converted output voltage on both ends of the first cell and the second cell coupled in series in the battery supply circuit.

In some embodiments, the charging interface includes a data line, the method further includes: performing bidirectional communication with the adapter through the data line to negotiate the charging mode between the adapter and the device to be charged.

In some embodiments, performing bidirectional communication with the adapter through the data line to negotiate the charging mode between the adapter and the device to be charged comprises: receiving a third instruction sent by the adapter, in which the third instruction is configured to query whether the device to be charged turns on the fifth charging mode; and sending a reply instruction of the third instruction to the adapter, in which the reply instruction of the third instruction is configured to indicate whether the device to be charged agrees to turn on the fifth charging mode.

In some embodiments, the charging control method 50 includes: in a case that the device to be charged agrees to turn on the fifth charging mode, sending the first control instruction.

In some embodiments, performing bidirectional communication with the adapter through the data line to negotiate the charging mode between the adapter and the device to be charged, comprises: receiving a fourth instruction sent by the adapter, in which the fourth instruction is configured to query whether the device to be charged turns on the fourth charging mode; and sending a reply instruction of the fourth instruction to the adapter, in which the reply instruction of the fourth instruction is configured to indicate whether the device to be charged agrees to turn on the fourth charging mode.

In some embodiments, the charging control method 50 includes: in a case that the device to be charged agrees to turn on the fourth charging mode, sending the second control instruction.

With the charging control method according to the embodiments of the present disclosure, it is possible to perform charging control for the device to be charged that has a battery supply circuit applicable for various charging schemes. Based on bidirectional communication with the adapter, different charging modes can be switched according to the type of the adapter, thereby improving the user experience.

It should be noted that the above-mentioned drawings are merely a schematic description of processes included in the method according to the example embodiment of the present disclosure, and are not for limiting purposes. It is easy to understand that the processes shown in the above drawings do not indicate or limit the chronological order of these processes. In addition, it is also easy to understand that these processes may be, for example, performed synchronously or asynchronously in multiple modules.

The example embodiments of the present disclosure have been particularly shown and described above. It should be understood that the present disclosure is not limited to the detailed structure, arrangement, or implementation method described herein; rather, the present disclosure is intended to cover various modifications and equivalent arrangements included within the spirit and scope of the appended claims.

What is claimed is:

1. A device to be charged, comprising:
   a battery supply circuit, comprising a first cell and a second cell, wherein the first cell and the second cell are configured to switch between being coupled in parallel with each other and being coupled in series with each other;
   a charging interface, wherein the device to be charged receives an output voltage and an output current of an adapter through the charging interface;
   a first charging circuit, wherein the first charging circuit is coupled between the charging interface and the battery supply circuit, and is configured to convert the output voltage, and apply the converted output voltage on both ends of the first cell and the second cell coupled in parallel in the battery supply circuit; and
   a second charging circuit, wherein the second charging circuit is coupled between the charging interface and the battery supply circuit; and the second charging circuit is configured to directly apply the output voltage and the output current on both ends of the first cell and the second cell coupled in series in the battery supply circuit, or directly apply the output voltage and the output current on both ends of the first cell and the second cell coupled in parallel in the battery supply circuit.

2. The device according to claim 1, wherein the first charging circuit comprises a charging integrated circuit, and the charging integrated circuit is coupled between the battery supply circuit and other circuits of the device to be charged, and is configured to cause the battery supply circuit to supply power to the other circuits of the device to be charged.

3. The device according to claim 2, wherein the charging integrated circuit comprises a circuit management module, and the circuit management module is configured to manage a charging circuit of the first cell and the second cell in the battery supply circuit and a charging circuit for supplying power to the other circuits.

4. The device according to claim 2, wherein in a case that the second charging circuit directly applies the output voltage and the output current on both ends of the first cell and the second cell coupled in series, the first charging circuit is coupled to the first cell, and is configured to supply power to the other circuits through voltage on both ends of the first cell.

5. The device according to claim 2, wherein in a case that the second charging circuit directly applies the output voltage and the output current on both ends of the first cell and the second cell coupled in series, the first charging circuit is coupled to the adapter to draw energy from the adapter to charge the other circuits.

6. The device according to claim 1, wherein the adapter supports a first charging mode, a second charging mode, and a third charging mode; in the first charging mode, the first charging circuit applies the converted output voltage on both ends of the first cell and the second cell coupled in parallel in the battery supply circuit; in the second charging mode, the second charging circuit directly applies the output voltage and the output current on both ends of the first cell and the second cell coupled in parallel in the battery supply circuit; and in the third charging mode, the second charging circuit directly applies the output voltage and the output current on both ends of the first cell and the second cell coupled in series in the battery supply circuit.

7. The device according to claim 6, wherein the charging interface comprises a data line, the device to be charged further comprises a control unit, and the control unit is configured to perform bidirectional communication with the adapter through the data line to negotiate the charging mode between the adapter and the device to be charged.

8. The device according to claim 7, wherein the control unit performs bidirectional communication with the adapter through the data line to negotiate the charging mode between the adapter and the device to be charged, comprises: the control unit receiving a first instruction sent by the adapter, wherein the first instruction is configured to query whether the device to be charged turns on the third charging mode; and the control unit sending a reply instruction of the first instruction to the adapter, wherein the reply instruction of the first instruction is configured to indicate whether the device to be charged agrees to turn on the third charging mode.

9. The device according to claim 8, wherein the control unit performs bidirectional communication with the adapter through the data line to negotiate the charging mode between the adapter and the device to be charged, comprises: the control unit receiving a second instruction sent by the adapter, wherein the second instruction is configured to query whether the device to be charged turns on the second charging mode; and the control unit sending a reply instruction of the second instruction to the adapter, wherein the reply instruction of the second instruction is configured to indicate whether the device to be charged agrees to turn on the second charging mode.

10. The device according to claim 1, further comprising a third charging circuit, wherein the third charging circuit comprises a switched-capacitor converter; and the third charging circuit is coupled between the charging interface and the battery supply circuit, and is configured to convert the output voltage by the switched-capacitor converter, and directly apply the converted output voltage on both ends of the first cell and the second cell coupled in series in the battery supply circuit, or directly apply the converted output voltage on both ends of the first cell and the second cell coupled in parallel in the battery supply circuit.

11. The device according to claim 10, wherein in a case that the third charging circuit directly applies the output voltage and the output current on both ends of the first cell and the second cell coupled in series, the first charging circuit is coupled to the first cell to charge the other circuits through voltage on the first cell.

12. The device according to claim 11, wherein in a case that the third charging circuit directly applies the output voltage and the output current on both ends of the first cell and the second cell coupled in series, the first charging circuit is coupled to the adapter to draw energy from the adapter to charge the other circuits.

13. The device according to claim 10, wherein the adapter supports a fourth charging mode and a fifth charging mode; in the fourth charging mode, the third charging circuit applies the converted output voltage on both ends of the first cell and the second cell coupled in parallel in the battery supply circuit; and in the fifth charging mode, the third charging circuit applies the converted output voltage on both ends of the first cell and the second cell coupled in series in the battery supply circuit.

14. The device according to claim 13, wherein the charging interface comprises a data line, the device to be charged further comprises a control unit, and the control unit is configured to perform bidirectional communication with the adapter through the data line to negotiate the charging mode between the adapter and the device to be charged.

15. The device according to claim 14, wherein the control unit performs bidirectional communication with the adapter through the data line to negotiate the charging mode between the adapter and the device to be charged, comprises: the control unit receiving a third instruction sent by the adapter, wherein the third instruction is configured to query whether the device to be charged turns on the fifth charging mode; and the control unit sending a reply instruction of the third instruction to the adapter, wherein the reply instruction of the third instruction is configured to indicate whether the device to be charged agrees to turn on the fifth charging mode.

16. The device according to claim 15, wherein the control unit performs bidirectional communication with the adapter through the data line to negotiate the charging mode between the adapter and the device to be charged, comprises: the control unit receiving a fourth instruction sent by the adapter, wherein the fourth instruction is configured to query whether the device to be charged turns on the fourth charging mode; and the control unit sending a reply instruction of the fourth instruction to the adapter, wherein the reply instruction of the fourth instruction is configured to indicate whether the device to be charged agrees to turn on the fourth charging mode.

17. A method of charging control for charging a device to be charged, wherein the device to be charged comprises a battery supply circuit, a charging interface and a charging integrated circuit, the battery supply circuit comprises: a first cell, and a second cell; and the method comprises:
  in response to receiving a first control instruction, switching the first cell and the second cell to be coupled in series in the battery supply circuit;
  in response to receiving a second control instruction, switching the first cell and the second cell to be coupled in parallel;
  receiving an output voltage and an output current of an adapter through the charging interface;

converting the output voltage by the charging integrated circuit, and applying the converted output voltage on both ends of the first cell and the second cell coupled in parallel in the battery supply circuit; and directly applying the output voltage and the output current on both ends of the first cell and the second cell coupled in series in the battery supply circuit, or directly applying the output voltage and the output current on both ends of the first cell and the second cell coupled in parallel in the battery supply circuit.

18. The method according to claim 17, further comprising:

causing the battery supply circuit to supply power to other circuits of the device to be charged by the charging integrated circuit.

19. The method according to claim 18, further comprising: in response to directly applying the output voltage and the output current on both ends of the first cell and the second cell coupled in series, supplying power to the other circuits through the charging integrated circuit using voltage on the first cell.

20. The method according to claim 17, wherein the adapter supports a first charging mode, a second charging mode, and a third charging mode; in the first charging mode, the charging integrated circuit applies a converted output voltage on both ends of the first cell and the second cell coupled in parallel in the battery supply circuit; in the second charging mode, the charging integrated circuit directly applies the output voltage and the output current on both ends of the first cell and the second cell coupled in parallel in the battery supply circuit; and in the third charging mode, the charging integrated circuit directly applies the output voltage and the output current on both ends of the first cell and the second cell coupled in series in the battery supply circuit, or wherein the adapter supports a fourth charging mode and a fifth charging mode; in the fourth charging mode, a switched-capacitor converter applies the converted output voltage on both ends of the first cell and the second cell coupled in parallel in the battery supply circuit; in the fifth charging mode, the switched-capacitor converter applies the converted output voltage on both ends of the first cell and the second cell coupled in series in the battery supply circuit, wherein the device to be charged comprises a switched-capacitor converter.

* * * * *